UNITED STATES PATENT OFFICE.

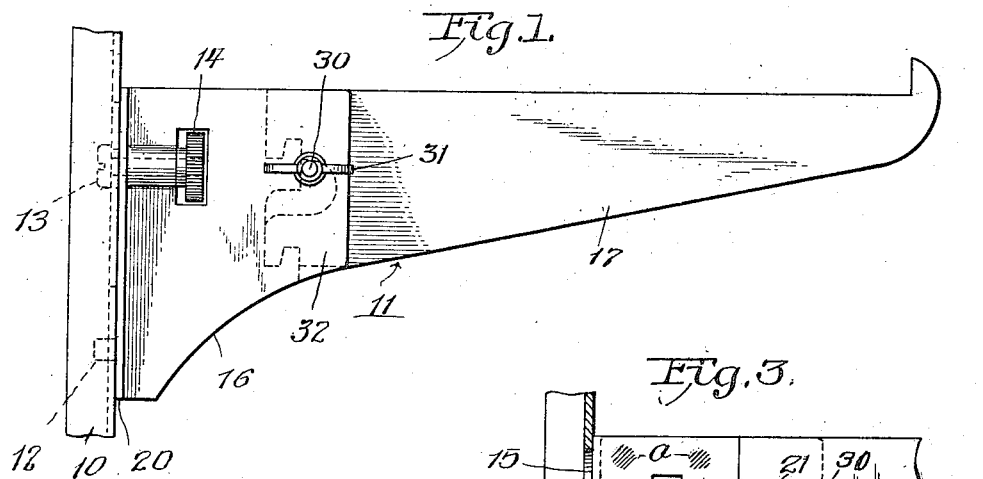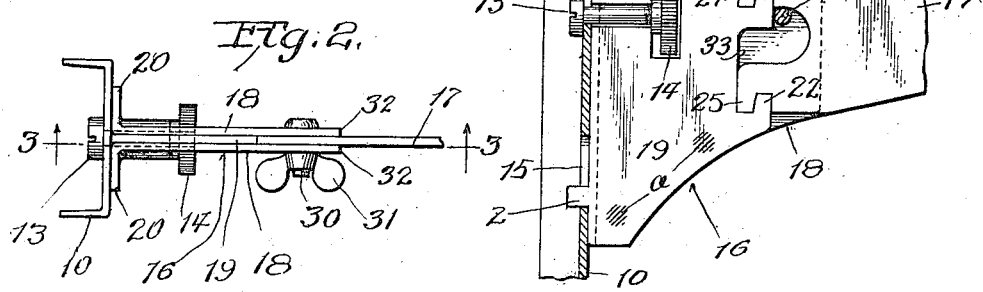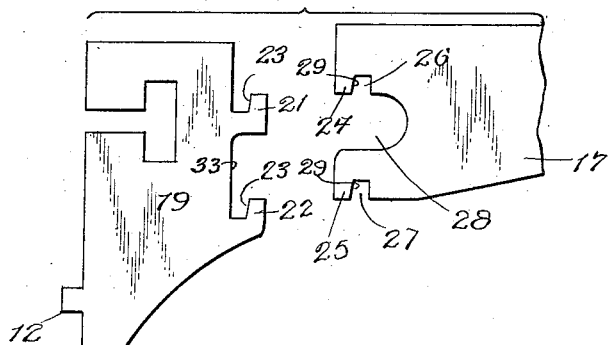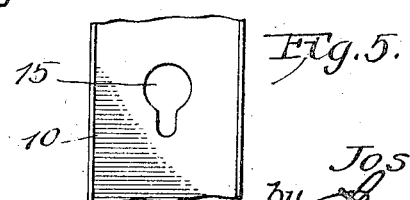

JOSEPH TAUSSIG, OF CHICAGO, ILLINOIS.

BRACKET.

1,254,170.

Specification of Letters Patent.

Patented Jan. 22, 1918.

Application filed January 29, 1917. Serial No. 145,053.

*To all whom it may concern:*

Be it known that I, JOSEPH TAUSSIG, a citizen of the United States, and a resident of Chicago, county of Cook, and State of Illinois, have invented certain new and useful Improvements in Brackets, of which the following is declared to be a full, clear, and exact description.

This invention relates to brackets, and its object is to provide a two part bracket of which the horizontal supporting arm is detachably secured to the attaching member. Another object is to provide a bracket in which the supporting arm is interchangeable with others whereby one and the same standard form of attaching member may be used with various forms of arms.

To such ends, this invention consists in the several novel features hereinafter fully set forth and claimed.

The invention is clearly illustrated in the accompanying drawings in which:

Figure 1, is a side elevation of a bracket containing a simple embodiment of the present invention; Fig. 2, is a plan thereof, with the arm partly broken away; Fig. 3, is a vertical longitudinal section taken on line 3—3 of Fig. 2; Fig. 4, is a side elevation of one piece of the attaching member and a fragment of the arm detached therefrom, and Fig. 5, is a rear view of a fragment of the upright supporting member for the bracket.

Referring to said drawing, 10 designates an upright member, upon which one or a number of the brackets 11, may be removably secured. The bracket 11, is provided with means for detachably securing it to the upright member 10, and the means shown, comprises a lug 12, near the bottom of the bracket, and a headed screw threaded pin 13, mounted in the bracket and having a nut 14, threaded thereon and located in a slot formed in the bracket; the head and lug are arranged to project into keyhole slots 15, formed in the upright, and by screwing up the nut on the screw threaded pin, the upright member is clamped between the head of the pin and bracket.

The bracket 11, comprises an attaching member 16, and an arm 17, removably secured thereto. In the form of the invention shown, the attaching member 16, comprises three sheet metal pieces 18, 18, 19, permanently secured together as by spotwelding them as at *a*. (See Fig. 3.) At the base of the attaching member, the edge portions of the outer pieces 18, 18, are bent outward to provide flanges 20, that are arranged to bear against the upright member 10. The members 18, are bent outward around the screw threaded pin 13, and the nut 14 bears against said outwardly bent portions. The lug 12, is preferably formed on the intermediate piece 19. If desired, the base of the attaching member is made longer than the other end to provide a long bearing against the upright.

The intermediate member 19, is made narrower than the outer members 18, 18, to provide a slot between the forward ends 32, of the outer members, and the intermediate member has a plurality of forwardly and upwardly projecting parts that form lugs 21, 22. The edges 23, of the lugs are inclined to provide for a wedge-like action on the arm. A bolt or screw 30, extends through the ends 32, of the outer members and has a thumb nut 31, threaded thereon.

The arm 17, is preferably made of sheet metal and is of the same thickness as the intermediate member 19, and of the same width at the attaching end as the end portions 32, of the attaching member. The arm may be considerably narrower at its outer end, and in fact its shape may be altered to suit each particular requirement. At its attaching end are upper and lower lugs 24, 25, which are formed by cutting notches 26, 27, in the arm and by cutting a U-shaped notch 28 from the end portion; the notch 26, opens upward from the notch 28, and the notch 27, opens upward from the lower edge of the arm. The edges 29, of the lugs are inclined to provide a wedge-like action on the lugs 21, 22, of the attaching member.

The arm is attached to the attaching member 16, by inserting the attaching end between the end portions 32, of the attaching member, the lower edges of the lugs 24, 25, passing over the upper edges of the lugs 21, 22. When the end of the arm strikes the forward edge 33, of the intermediate member 19, the arm is lowered to bring the inclined edges of the lugs into engagement; the thumb nut is then screwed up thereby clamping the arm between the end portions, making it impossible to detach the arm from the attaching member without first loosening the nut. The friction between the arm and end portions 32, of the attaching member prevents relative movement between the two parts in a vertical direction and the lugs prevent endwise movement of the arm with respect to the attaching member. To detach the arm, the wing nut is loosened, the arm raised to detach the lugs and then drawn forward.

It is to be observed that any desirable shape of arm may be used, and that any desired length of arm may be employed, thus making the bracket usable for a great many purposes. Two or more may be used for supporting a shelf, or one may be used to support and display merchandise.

I claim as new and desire to secure by Letters Patent:

1. A bracket comprising an attaching member, and a detachable arm, said attaching member comprising two outer pieces and an intermediate piece permanently secured together, the outer pieces being longer than the inner piece and projecting beyond it, and said inner piece having upwardly projecting lugs, and said arm having downwardly projecting lugs on one end arranged to interlock with the lugs of the inner piece, and means having a part extending through the projecting portions of the outer pieces and in front of one of the lugs of the intermediate pieces, and adapted to clamp said projecting portions upon said arm, said end of the arm being formed with an opening for the passage of the clamping means whereby the arm may be detached from the attaching member without removing the clamping means.

2. A bracket comprising an attaching member, and a detachable arm, said attaching member comprising two outside pieces and an intermediate piece permanently secured together, the outer pieces projecting beyond the forward edge of the intermediate piece, and the intermediate piece having upper and lower upwardly projecting tapered lugs, and said arm having upper and lower downwardly projecting tapered lugs at one end interlocking with the lugs of the intermediate piece, said arm having a notch extending inward between said lugs, and a clamping member having a part extending through said projecting ends and through the notch of said arm whereby said arm may be detached from the attaching member without removing the clamping member.

JOSEPH TAUSSIG.

Copies of this patent may be obtained for five cents each, by addressing the "Commissioner of Patents, Washington, D. C."